United States Patent
Liu et al.

(10) Patent No.: US 8,194,225 B2
(45) Date of Patent: Jun. 5, 2012

(54) ARRAY SUBSTRATE FOR LCD DEVICE

(75) Inventors: Chu-Yu Liu, Taichung County (TW);
Chung-Jen Chengchiang, Hualien County (TW); Kuei-Sheng Tseng, Taoyuan County (TW)

(73) Assignee: Au Optronics Corp., Hsinchu (TW)

( * ) Notice: Subject to any disclaimer, the term of this patent is extended or adjusted under 35 U.S.C. 154(b) by 337 days.

(21) Appl. No.: 12/574,806

(22) Filed: Oct. 7, 2009

(65) Prior Publication Data
US 2010/0022155 A1 Jan. 28, 2010

Related U.S. Application Data

(62) Division of application No. 11/298,389, filed on Dec. 9, 2005, now Pat. No. 7,619,711.

(30) Foreign Application Priority Data

Sep. 29, 2005 (TW) .............................. 94133968 A

(51) Int. Cl.
*G02F 1/1339* (2006.01)
(52) U.S. Cl. ..................................................... 349/156
(58) Field of Classification Search .................. 349/156
See application file for complete search history.

(56) References Cited

U.S. PATENT DOCUMENTS

| | | |
|---|---|---|
| 4,568,149 A | 2/1986 | Sugata et al. |
| 5,739,890 A | 4/1998 | Uda et al. |
| 6,411,360 B1 | 6/2002 | Matsuyama et al. |
| 6,568,149 B2 | 5/2003 | Lacasse |
| 7,057,695 B2 | 6/2006 | Mun et al. |
| 2006/0158600 A1 | 7/2006 | Mun et al. |
| 2006/0285060 A1 | 12/2006 | Misaki et al. |

FOREIGN PATENT DOCUMENTS

| | | |
|---|---|---|
| EP | 0209112 | 1/1987 |
| JP | 2002214619 A | 7/2002 |
| JP | 2004301960 A | 10/2004 |
| TW | 200426475 | 4/1993 |

OTHER PUBLICATIONS

TW Office Action mailed Dec. 12, 2006, cited in parent application.
CN Office Action mailed Mar. 30, 2007, cited in parent application.

*Primary Examiner* — James Dudek
(74) *Attorney, Agent, or Firm* — Thomas|Kayden

(57) ABSTRACT

An array substrate for a liquid crystal display (LCD) device. An exemplary embodiment of an array substrate comprises a transparent substrate. A plurality of first and second conductive lines overlies the transparent substrate and cross over each other, thereby defining a plurality of display regions. At least one first spacer overlies a portion of the first or second conductive lines, wherein the first spacer is not formed over an intersection of the first and second conductive lines. A pixel electrode layer overlies the display regions, wherein the first spacer partially covers the pixel electrode layer.

8 Claims, 3 Drawing Sheets

ARRAY SUBSTRATE FOR LCD DEVICE

CROSS-REFERENCE TO RELATED APPLICATION

This application is a division of U.S. patent application Ser. No. 11/298,389, filed Dec. 9, 2005, and entitled "Array Substrate for LCD Device," now U.S. Pat. No. 7,619,711 which is incorporated herein by reference.

BACKGROUND

The present invention relates to a liquid crystal display (LCD) device, and in particular to an array substrate for an LCD device.

In new generation panel display technologies, LCD devices have the advantages of thin profile, light weight, and low power consumption and therefore are widely applied in electronic devices such as mobile phones and portable computers.

Generally, LCDs have an upper and a lower substrate with electrodes thereon. Conventionally, many TFTs are formed above the lower substrate as switching devices. Each TFT has a gate electrode connected to a scanning line, a drain electrode connected with a signal line, and a source electrode connected to a pixel electrode. The upper substrate includes a color filter layer, showing colors such as green, red or blue, and a black matrix layer. These substrates are sealed with adhesive materials, and a liquid crystal material is sealed between these two substrates. Before the liquid crystal is injected between the two substrates, spacers are sprayed between the substrates in order to maintain a constant distance therebetween.

Normally, during LCD device assembly, these substrates are installed in parallel and a cavity is formed between these two precisely aligned substrates by forming adhesive materials therebetween. Next, a liquid crystal (LC) filling process, for example vacuum insertion, is performed on the cavity to thereby fill an LC material therebetween. The LC material flows between the spacers formed in the LCD device.

During LCD device assembly, however, undesired misalignment between these substrates still occurs and some of the spacers which should be covered by the black matrix layer are somehow revealed, thus pixel performances of the LCD device suffers. Therefore, a need exists for a method of solving such spacer revealing issues due to substrate misalignment.

SUMMARY

Array substrates for LCD devices are provided. LCD devices using the same and methods for assembling the same are also provided. An array substrate for an LCD device is provided with at least one spacer thereon. The spacer is located at a non-intersection point of conductive lines formed over the array substrate and substantially aligns to a black matrix layer over a color filter substrate of the LCD and is therefore limited by color filter layers adjacent thereto. Therefore, the spacer will not be revealed when misalignment occurs during the LCD device assembling and display performance of adjacent pixel units thereto is thus ensured.

An exemplary embodiment of the array substrate comprises a transparent substrate. A plurality of first and second conductive lines overlies the transparent substrate and cross over each other, thereby defining a plurality of display regions. At least one first spacer overlies a portion of the first or second conductive lines, wherein the first spacer is not formed over an intersection portion of the first and second conductive lines. A pixel electrode layer overlies the display regions, wherein the first spacer partially covers the pixel electrode layer.

An exemplary embodiment of an LCD device comprises an array substrate and a color filter substrate. A liquid crystal layer is filled between the array substrate and the color filter layer. The array substrate comprises a first transparent substrate. A plurality of first and second conductive lines overlies the first transparent substrate and crosses over each other, defining a plurality of display regions. At least one first spacer overlies a portion of the first or second conductive lines, wherein the at least one first spacer is not formed over an intersection of the first and second conductive lines. A pixel electrode layer overlies the display regions, the first spacer partially covers the pixel electrode layer. The color filter substrate comprises a second transparent substrate. A black matrix layer overlies the second transparent substrate, defining a plurality of light-transmitting regions. A color filter layer overlies the second transparent substrate within the light-transmitting regions and partially covers the black matrix layer to thereby form a recess portion, wherein the first spacer supports the recess portion to thereby align the display regions to the light-transmitting regions.

An exemplary embodiment of a method for assembling an LCD device comprises providing the described array substrate and the color filter substrate. The first spacer over the array substrate aligns with the recess portion over the color filter substrate. The array substrate presses against the color filter substrate to make the first spacer support the recess portion and align the display regions with the light-transmitting regions.

BRIEF DESCRIPTION OF THE DRAWINGS

The invention can be more fully understood by reading the subsequent detailed description and examples with reference made to the accompanying drawings, wherein.

DESCRIPTION

An array substrate for LCD devices is now described in greater detail. Some embodiments described, can potentially prevent revealed spacers due to misalignment between array substrate and color filter substrates of the LCD device. In some embodiments, this can be accomplished by forming a spacer over the array substrate and a recess portion over the color filter substrate. During LCD device assembly, the spacer over the array substrate aligns with the recess portion over the color filter substrate. The array substrate presses against the color filter substrate to make the first spacer support the recess portion and align the display regions over the array substrate with the light-transmitting regions over the color filter substrate.

Figure 1:
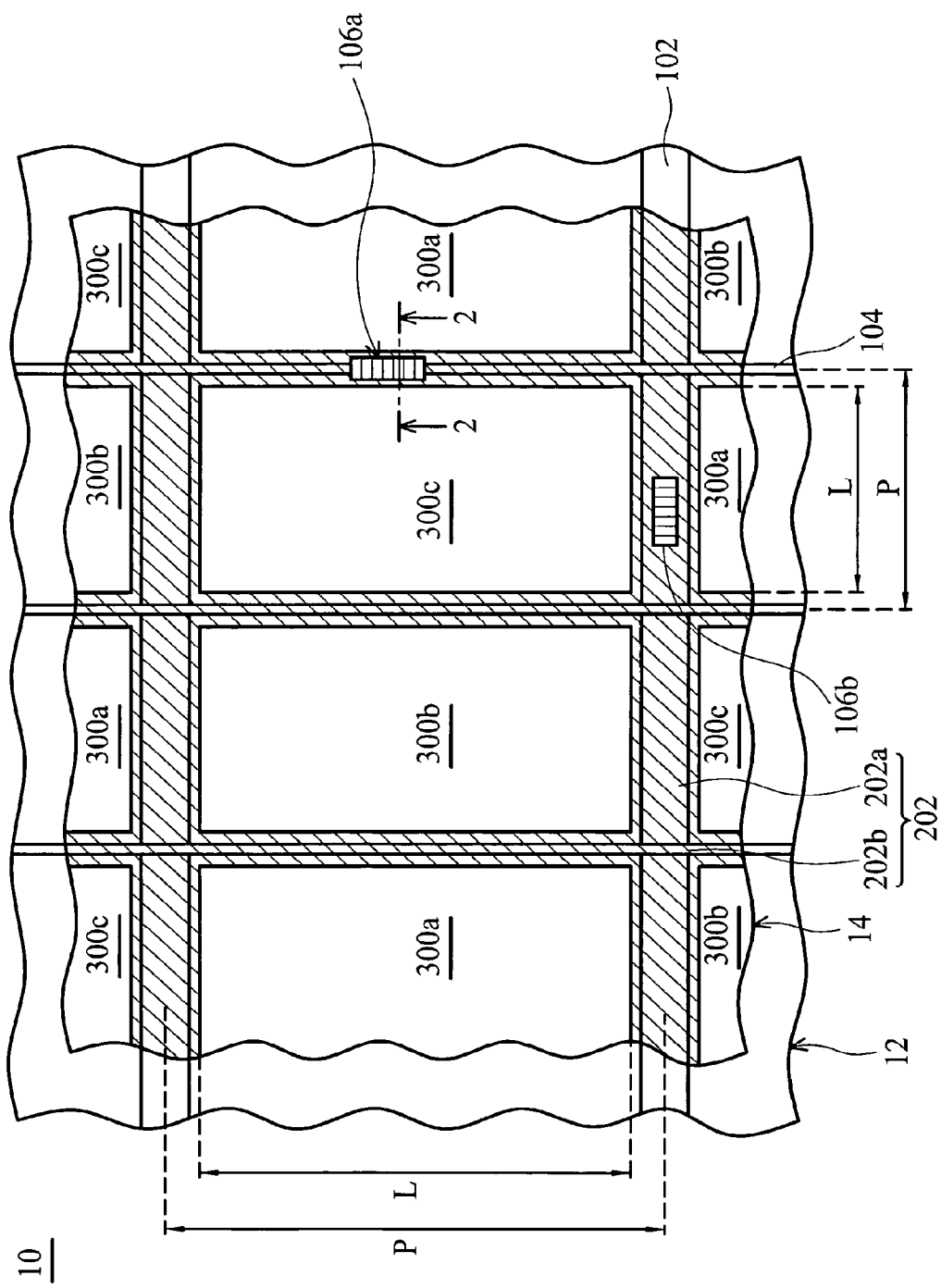
FIG. 1 is a schematic diagram, showing a top view of a LCD device according to an embodiment of the invention.
Figure 2:
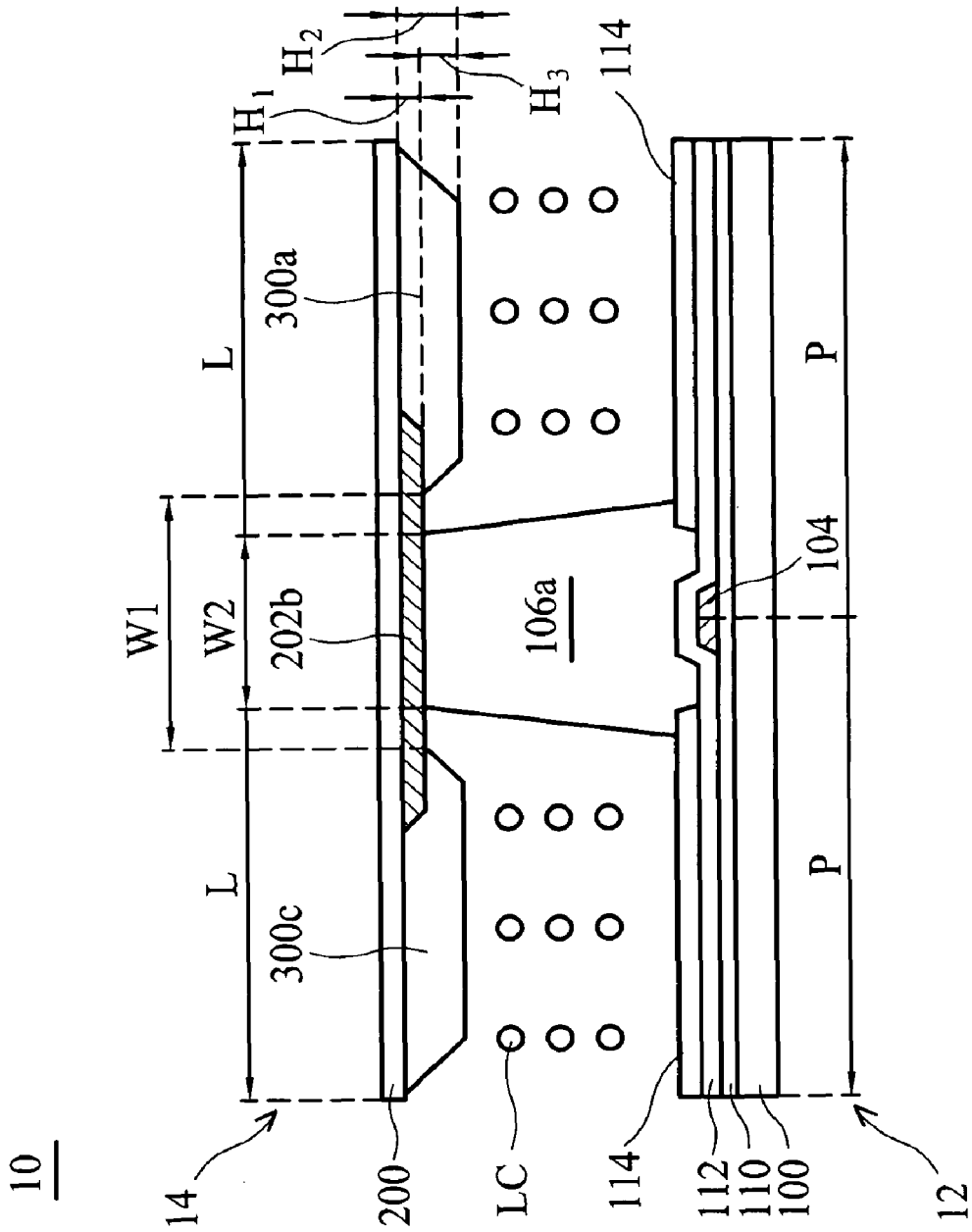
FIG. 2 is a cross section taken along line 2-2 of FIG. 1, showing a partial cross-section of an LCD device according to an embodiment of the invention.
Figure 3:
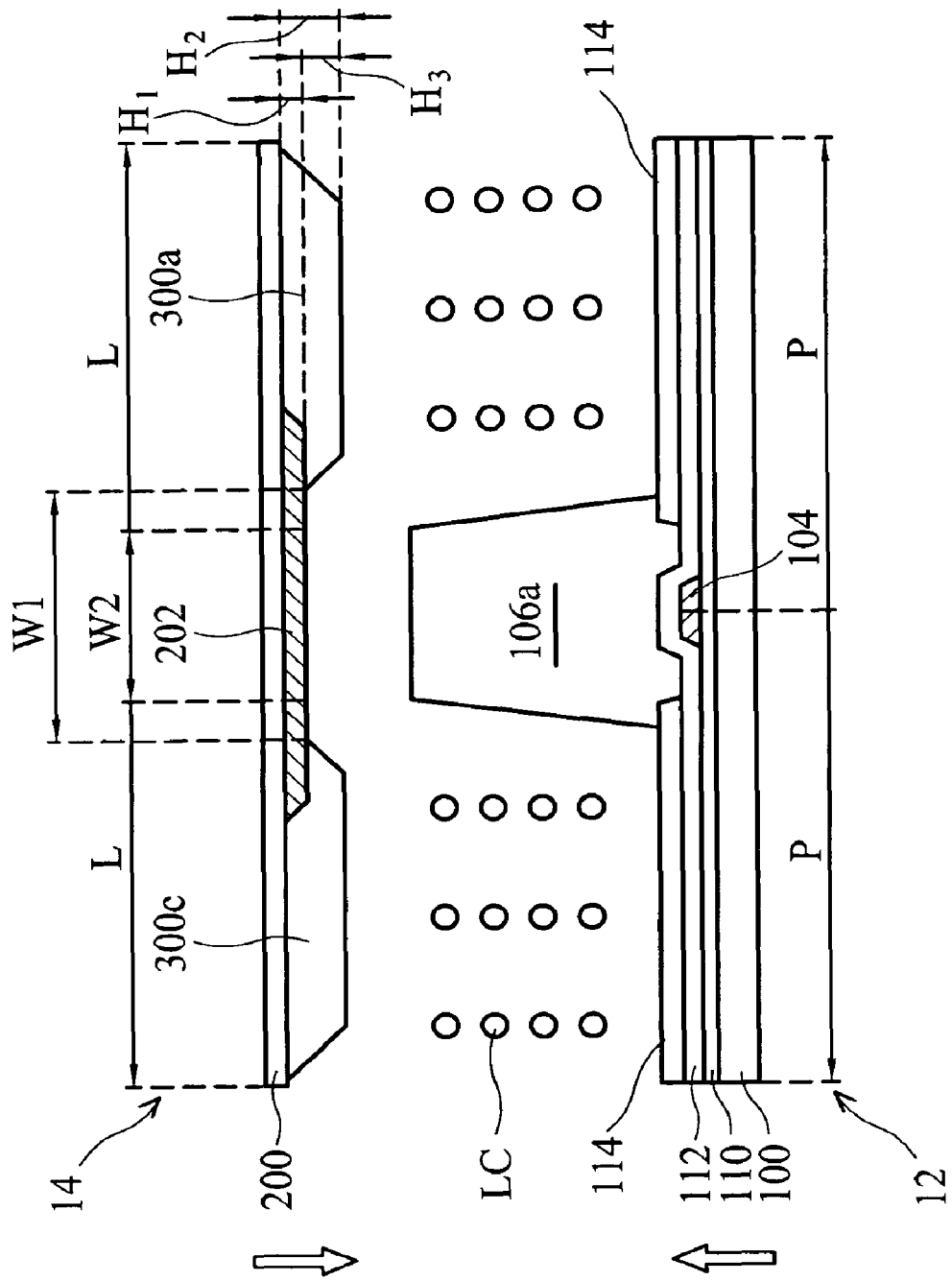
FIG. 3 is a cross-section taken along line 2-2 of FIG. 1, showing a method for LCD device assembling according to an embodiment of the invention.

Referring now to the drawings, FIGS. 1-3 are schematic diagrams of an exemplary embodiment of an LCD device 10. In FIG. 1, a top view of the LCD device 10 is illustrated to partially show arrangements therein.

As shown in FIG. 1, the LCD device 10 includes a lower array substrate 12 and an upper color filter (CF) substrate 14. A liquid crystal (LC) layer (not shown) is sandwiched between the array substrate 12 and the CF substrate 14. The array substrate includes a transparent substrate 100 formed with a plurality of crossed gate lines 102 and data lines 104 thereon. Herein, gate lines 102 are illustrated as horizontally extending conductive lines, functioning as scan lines, and data lines 140 are illustrated as vertically extending lines, functioning as signal lines. These crossed gate lines 102 and data lines 104 define a plurality of display regions P over the transparent substrate 100.

Moreover, still referring to FIG. 1, the color filter substrate 14 includes a transparent substrate 200 formed with a black matrix layer 202 thereon. The black matrix layer 202 includes a plurality of first black matrix segments 202a and second black matrix segments 202b which cross each other, thereby defining a plurality of light-transmitting regions L over the transparent substrate 200. Herein, the first black matrix segments 202a are, for example, horizontally extended and the second black matrix segments 202b are, for example, vertically extended, and overlie the transparent substrate 200. Within each of the light-transmitting regions L, color filter layers of different colors, such as red CF layer 300a, green CF layer 300b or blue CF layer 300c, are formed. Each of the light-transmitting regions L respectively oppose a display region P.

Still shown in FIG. 1, a spacer 106b is formed below one of the first black matrix segments 202a, and another spacer 106a is formed below one of the second black matrix segments 202b. The spacers 106b, 106a are preferably located at a non-intersection point of the first and second black matrix segments 202a, 202b, to thereby reduce misalignment between the array substrate 12 and the CF substrate 14, thus enhanced process windows for the LCD device 10 are provided during assembly. Herein, the spacers 106a, 106b are respectively adjacent to two different light-transmitting regions L. Within the LCD device 10, the above spacers can be arranged as described in the following:

(a) one or more spacers 106a or 106b are provided below a black matrix segment adjacent to one or more light-transmitting region L;

(b) a plurality of spacers 106a or 106b are provided below the black matrix segments adjacent to one light-transmitting region L, wherein the spacers substantially surround the light-transmitting region L; and (c) one or more spacers 106a and 106b are provided below a portion of one or more black matrix segments adjacent to one or more light-transmitting regions L.

Those skilled in the art will understand that the arrangement of the spacers 106a, 106b are not limited to the described and illustrated in FIG. 1. Other arrangements are anticipated and fall within the scope of the invention.

Next, in FIG. 2, a cross-section taken along line 2-2 of FIG. 1 is illustrated, showing a part of the LCD device 10. As shown in FIG. 2, the array substrate is provided with a transparent substrate 100 formed with a data line 104 thereon, separating two adjacent display regions P. A buffer layer 110, an insulating layer covering the data line 104 and a pixel electrode layer 114 are formed over the transparent substrate 100. In addition, a spacer is formed over the transparent substrate 100, referring to spacer 106a here, has a tapered shape but is not limited to the shape illustrated in FIG. 2. As shown in FIG. 2, the spacer 106a has an upper width of about 5.0-15.0 μm. The spacer 106a may comprise photosensitive materials such as polymer, resist material, resin and silicon compounds and can be formed by a process including photo-lithography and sequential development, without requiring additional etching steps. As shown in FIG. 2, the spacer 106a crosses over two adjacent display regions P and covers the insulating layer 112 and a part of the pixel electrode layer 114. Herein, the size of pixel electrode layer 114 can be further reduced and the pixel electrode layer may be not covered by the spacer 106a (not shown).

Moreover, the color filter substrate 14 includes a transparent substrate 200 formed with a black matrix layer thereon, illustrating as the second black matrix segments 202b separating two adjacent light-transmitting regions L here. Within each light-transmitting region L, a color filter layer is formed over the transparent substrate 200 and illustrated as the color filter layer 300c or 300a, partially covering the second black matrix segments 202b. The second black matrix segment 202b is formed with a thickness $H_1$ of about 0.5-1.5 μm, and the CF layers 300c, 300a are formed with a thickness $H_2$ of about 1.0-3.0 μm, having a gap $H_3$ of about 0.5-2.5 μm therebetween and forming a recess portion therebetween. Herein, the portion of the second black matrix segment 202b not covered by the CF layer 300c and 300a has a width $W_1$ of about 20-30 μm, defining a width of the recess portion. In the LCD device 10, the recess portion of the CF layer 14 substantially aligns with the spacer 16 overlying the array substrate 12 and is supported thereby, a vacant space of less than 7 μm still exists between the first spacer 106a and the recess portion, thereby providing a suitable process window for LCD device assembly. When misalignment occurs during LCD device assembly, the spacer 106a is limited by the gap defined by the CF layers 300a and 300c over the CF layer 14 and the first black matrix segments 202a, and the spacer 106a will not be exposed through the light-transmitting region L and pixel performance of the adjacent display regions P are ensured.

Moreover, the distance between the CF substrate 14 and the array substrate 12 is defined by the thickness of the spacer 106a and a liquid crystal layer LC is formed and sandwiched thereby, thus the LCD device 10 is formed.

Next, in FIG. 3, a cross section taken along lines 2-2 of FIG. 1 is illustrated, showing a method for assembly the LCD device 10.

As shown in FIG. 3, the above array substrate 12 is first provided. The array substrate 12 is formed with the described elements thereon and a spacer 106a is formed over a conductive line, for example the data line 104, between adjacent display regions P. The spacer 106a is formed with, for example, a tapered shape as illustrated in FIG. 3 and is surrounded by a seal layer (not shown), defining an area for a plurality of display regions P. The liquid crystal layer LC is then formed in the display regions P by methods such as the one drop filling (ODF) method. Next, a CF substrate, for example the above mentioned CF substrate 14, is provided over the array substrate 12. The CF substrate 14 has a recess portion formed over a black matrix layer between adjacent light-transmitting regions L. Next, the array substrate and the CF substrate 14 are pressed toward each other under a vacuum atmosphere to thereby assembly the LCD device 10.

Within the LCD device 10 illustrated in FIG. 1, a plurality of spacers 106a and 106b are formed along a part of a conductive line over the array substrate but not formed at an intersection of the conducive lines thereon, thereby providing alignment assistance along vertical and/or horizontal directions during LCD device assembly. The formed spacers substantially align to a recess portion formed over a CF substrate and are limited thereto during LCD device assembling, thereby avoiding reveals of the spacers into the light-transmitting regions. Thus, extra assembling process windows and reduced effect to the pixel units are provided. The amounts and arrangements of the spacers can be varied according practical LCD device design and is not limited to that illustrated in FIG. 1.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for assembling a liquid crystal display (LCD) device, comprising:
   providing an array substrate, comprising:
      a first transparent substrate;
      a plurality of first and second conductive lines overlying the first transparent substrate, crossing over each other, defining a plurality of display regions;
      a pixel electrode layer overlying the first transparent substrate within each of the display regions; and
      at least one first spacer overlying a portion of the first or second conductive lines, wherein the first spacer is not formed over an intersection of the first and second conductive lines, and the first spacer crosses over two of the display regions adjacent thereto and physically contacts with a part of the pixel electrode in the two of the display regions adjacent to the first spacer;
   providing a color filter substrate, comprising:
      a second transparent substrate;
      a black matrix layer overlying the second transparent substrate, defining a plurality of light-transmitting regions; and
      a color filter layer overlying the second transparent substrate in the light-transmitting regions, partially covering the black matrix layer to thereby form a recess portion between two adjacent light-transmitting regions;
   aligning the first spacer with the recess portion; and
      pressing the array substrate with the color filter substrate, making the first spacer support the recess portion and aligning the display regions with the light-transmitting regions, wherein the black matrix layer exposed by the recess portion physically contacts with the first spacer.

2. The method as claimed in claim 1, before the step of pressing the array substrate with the color filter substrate, further comprising a step of filling the display regions with a liquid crystal material in.

3. The method as claimed in claim 1, further comprising at least one second spacer overlying the first or second conductive lines not formed with the first spacer thereon, the second spacer supports the recess portion in the step of pressing the array substrate with the color filter substrate.

4. The method as claimed in claim 1, wherein the first spacer is inserted in the recess portion and movement of the array substrate is thereby limited by the color filter layers adjacent to the recess portion.

5. The method as claimed in claim 3, wherein the second spacer is inserted in the recess portion and movement of the array substrate is thereby limited by the color filter layers adjacent to the recess portion.

6. The method as claimed in claim 3, wherein the recess portion extends along the first and second conductive lines and the first and second spacers are both inserted in the recess portion, thereby limiting movement of the array substrate.

7. The method as claimed in claim 1, wherein the first spacer comprises resin, polymer or silicon compound.

8. The method as claimed in claim 3, wherein the second spacer comprises resin, polymer or silicon compound.

* * * * *